(12) United States Patent
Chen (10) Patent No.: US 6,697,550 B2
(45) Date of Patent: Feb. 24, 2004

(54) FAST 1×N FIBER-OPTIC SWITCH

(75) Inventor: Qiushui Chen, Medford, MA (US)

(73) Assignee: Renka Corporation, Peabody, MA (US)

( * ) Notice: Subject to any disclaimer, the term of this patent is extended or adjusted under 35 U.S.C. 154(b) by 103 days.

(21) Appl. No.: 10/045,670

(22) Filed: Oct. 24, 2001

(65) Prior Publication Data

US 2003/0103718 A1 Jun. 5, 2003

(51) Int. Cl.[7] .......................... G02B 6/35; G02B 27/26; G02F 1/29
(52) U.S. Cl. .......................... 385/22; 385/11; 385/16; 359/245; 359/246; 359/315; 359/320; 359/483; 359/494
(58) Field of Search .............................. 385/16–22, 11, 385/36; 359/122, 127–129, 131, 245–246, 315, 320, 483, 494

(56) References Cited

U.S. PATENT DOCUMENTS

| | | | |
|---|---|---|---|
| 4,516,837 A | 5/1985 | Soref et al. | 350/347 |
| 4,852,962 A | 8/1989 | Nicia | 350/96.2 |
| 5,239,598 A | 8/1993 | Wight et al. | 385/8 |
| 5,630,004 A | 5/1997 | Deacon et al. | 385/129 |
| 5,727,109 A * | 3/1998 | Pan et al. | 385/140 |
| 5,852,688 A | 12/1998 | Brinkman et al. | 385/16 |
| 5,877,876 A | 3/1999 | Birdwell | 359/39 |
| 5,930,038 A * | 7/1999 | Swan | 359/484 |
| 6,137,619 A | 10/2000 | Chen et al. | 359/251 |
| 6,175,432 B1 | 1/2001 | Wu et al. | 359/124 |
| 6,201,593 B1 | 3/2001 | Wong et al. | 349/180 |
| 6,208,444 B1 * | 3/2001 | Wong et al. | 359/127 |
| 6,208,774 B1 | 3/2001 | Sorin et al. | 385/11 |

OTHER PUBLICATIONS

Tang, Suning et al., "High–speed Electro–Optic Switches for WDM Applications," SPIE 3949:164–174 (2000).*

Berthele, P. et al., "Efficient Beam Steering in the 1.55 Micron Window Using Large–Tilt FLC One–Dimensional Array," *Ferroelectronics* 214:117–124 (1998).

Jang, Chiou–Hung et al., "A Thin–Film Polymeric Waveguide Beam Deflector Based on Thermooptic Effect," *IEEE* 13 (5) : 490–492 (2001).

Mormile, Pasquale et al., "A Basic Element for Intergrated Electro–optical Devices Based on Liquid Crystal Waveguides," *SPIE* 4078:779–785.

Petti, Lucia et al., "Experimental Results on a New Inegrated Beam Deflector/Switch Based on Liquid Crystals," *Mol. Cryst. Lid. Cryst.* 331:189–199 (1999).

Petti, Lucia et al., "Electro–optical Behavior of an Integrated Device Based on a Liquid Crystal Waveguide," *SPIE* 3620:126–133 (1999).

Sun, Lin et al., "Laser Beam Deflector Based on a Domain–Inverted Electro–Optic Polymeric Waveguide Prism Array," *SPIE* 3632:134–141.

Sun, Lin et al.,"Beam Deflection with Electro–Optic Polymeric Waveguide Prism Array," *SPIE* 3950:98–107 (2000).

Tang, Suning et al., "High–speed Electro–Optic Switches for WDM Applications," *SPIE* 3949:164–174 (2000).

Tsai, C.S. and Saunier, P., "Ultrafast guided–light beam deflection/switching and modulation using simulated electro–optic prism structures in LiNbO$_3$ waveguides," *Applied Physics Letters* 27 (4) :248–250 (1975).

* cited by examiner

*Primary Examiner*—Hemang Sanghavi
*Assistant Examiner*—Omar Rojas
(74) *Attorney, Agent, or Firm*—Hamilton, Brook, Smith & Reynolds, P.C.

(57) ABSTRACT

An optical switch for switching an incoming light signal to one of a number of output ports in a polarization independent manner. The optical switch includes a walk-off device, and a compensator which compensates for walk-off distance variations of two polarized beams, with orthogonal polarization directions, associated with the walk-off device.

30 Claims, 6 Drawing Sheets

FAST 1×N FIBER-OPTIC SWITCH

BACKGROUND

Recently, fiber optics networks have been used instead of electrical systems to provide significantly higher bandwidth. However, some of these fiber optics networks employ electrical switches to direct communication signals from various input ports to one or more output ports. In these systems, the optical signal is converted to an electrical signal prior to the switching process. The electrical switch redirects the transmission of the electrical signal which is then converted back to an optical signal before being transmitted to the output port.

In all-optical networks, optical switches are used to direct a signal from one port or channel to another port or channel. For example, some have proposed using mechanical optical switches, such as micromachined mechanically actuated mirrors, or liquid crystal based switches, to redirect the light signal. As all-optical networks increase in complexity, the speed at which the optical switching process occurs becomes more important. But because the switching times of mechanical optical switches are in the order of milliseconds, and liquid crystal based switches offer only slightly higher speeds, their use is limited.

All-optical switches based on electro-optic (E-O) effects of certain solid-state materials offer significantly higher switching times, for example, in the order of microseconds to nanoseconds. Some proposed systems use E-O switches based on polarization conversion, while others use phase modulation.

It has also been proposed to use optical switches based on E-O beam deflection effects to provide high-speed, multi-channel switching. Typically, however, the light being transmitted through an ordinary optical fiber is randomly polarized while the E-O effect is polarization dependent. To make the fiber optic switching process polarization independent, some systems include an optical device that converts the incoming light signal into two linearly polarized light beams having the same polarization direction. An E-O based beam deflector is used to deflect these two beams which are then combined by a second optical device into a single output beam. In these system, each of the optical devices is typically formed from a pair of prisms which are expensive and difficult to fabricate. Further, these prisms typically cannot be made in a compact size.

SUMMARY

Birefringent crystals can be used as compact devices for separating a randomly polarized beam into two beams with orthogonal polarization directions, or combining two such beams into a single beam based on "walk-off" effects. These devices alone, however, are unsuitable for use as beam deflectors. Moreover, the walk-off distance between the two beams that have been separated or that are to be combined varies with the angle of incidence with the walk-off device. Accordingly, these variations cause two incoming beams to recombine imperfectly, and hence induce a polarization dependent loss. Therefore, there is a need to use walk-off devices with a compensator that eliminates these variations to provide an optical device with low polarization dependent loss.

The present invention implements a high-speed 1×N optical switch with an Electro-Optic (E-O) deflector. The optical switch redirects or steers an incoming light signal to a number of output light ports in a polarization independent manner.

In one aspect of the invention, the optical switch includes a walk-off device, and a compensator which compensates for walk-off distance variations of two polarized beams, with orthogonal polarization directions, associated with the walk-off device.

In some embodiments, the walk-off device is a crystal with birefringence such as, for example, yttrium vanadate or rutile. The compensator can be an isotropic plate such as glass. In certain embodiments, the walk-off device is arranged to separate an incoming beam into the two polarized beams, while in other embodiments, the walk-off device is arranged to combine the two polarized beams into a single beam.

In another aspect of the invention, the optical switch includes a separator which separates the incoming light signal into a first polarized beam and a second polarized beam so that the polarization direction of the first beam is orthogonal to that of the second beam. A first converter rotates the polarization direction of one of the two beams to align the polarization direction of that beam with the polarization direction of the other beam. An electro-optic (E-O) deflector deflects the two beams and a compensator displaces one of the two deflected beams relative to the other beam to minimize polarization dependent losses. A second converter rotates the polarization direction of the displaced beam so that it is orthogonal to the polarization direction of the other beam. A combiner then combines the two beams into a single output light signal which is directed to the output port.

Embodiments of this aspect can include one or more of the following features. In some embodiments, the separator and the combiner are walk-off devices. The walk-off devices can be crystals with birefringence properties such as yttrium or rutile. The first and the second rotators can be Faraday rotators, quartz rotators, or half-wave plates, and the compensator can be an isotropic plate, such as glass.

In certain embodiments, the E-O deflector includes a prism having an index of refraction that changes as an electric field is applied across the prism. For example, the prism can be a crystal made from lithium tantalate, lithium niobate, or KTN. In other embodiments, the prism can be made from a ferroelectric ceramics. Alternatively, the prism can be a liquid crystal dispersed polymer.

Some switches have an E-O deflector having two or more prisms. In some embodiments, the prisms have linear E-O properties such that the deflection of the two beams produced by the prisms is additive when the electric field applied to each prism has the same polarity. In other embodiments, the prisms are configured in a domain inversion arrangement. In this arrangement, the deflection of the two beams produced by the prisms is additive when the electric field applied to a respective prism has a polarity that is opposite to that applied to an adjacent prism. In yet other embodiments, the prisms are made from materials with quadratic E-O properties.

The optical switch can include or can be coupled with a collimator which directs the incoming light signal to the separator. The collimator can include, for example, an input lens and an input port. The optical switch can also include an output collimating lens and an array of output ports. The input port and the output ports are typically optical fibers. The output ports can be coupled to a fiber pigtailed channel wave-guide array which directs the light signal from the output lens to the array of output ports.

Related aspects of the invention include a method of using the device as an ultrafast 1×N switch. The method includes separating the input light signal into a first polarized beam and a second polarized beam so that the polarization direction of the first beam is orthogonal to that of the second beam. The polarization direction of one of the two beams is rotated to align with that of the other beam. The two beams are then deflected, and subsequently one of the two deflected beams is displaced an appropriate distance to minimize polarization dependent losses. The polarization direction of the displaced beam is rotated so that its polarization direction is again orthogonal to that of the other beam. The two beams are then combined into a single output light signal.

Embodiments of the invention may have one or more of the following advantages. The optical switch of the present invention is able to quickly redirect a light signal from one output fiber to another in time periods in the order of nanoseconds. The optical switch is compact in size, reliable, and requires low power to operate. A particular advantage of the optical switch is that it can switch the direction of a light signal in a polarization independent manner.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4A(i) is an illustration of a multi-stage E-O deflector in accordance with the invention.

FIG. 4A(ii) is a top view of the E-O deflector of FIG. 4A(i).

DETAILED DESCRIPTION OF THE INVENTION

A description of preferred embodiments of the invention follows.

Figure 1:
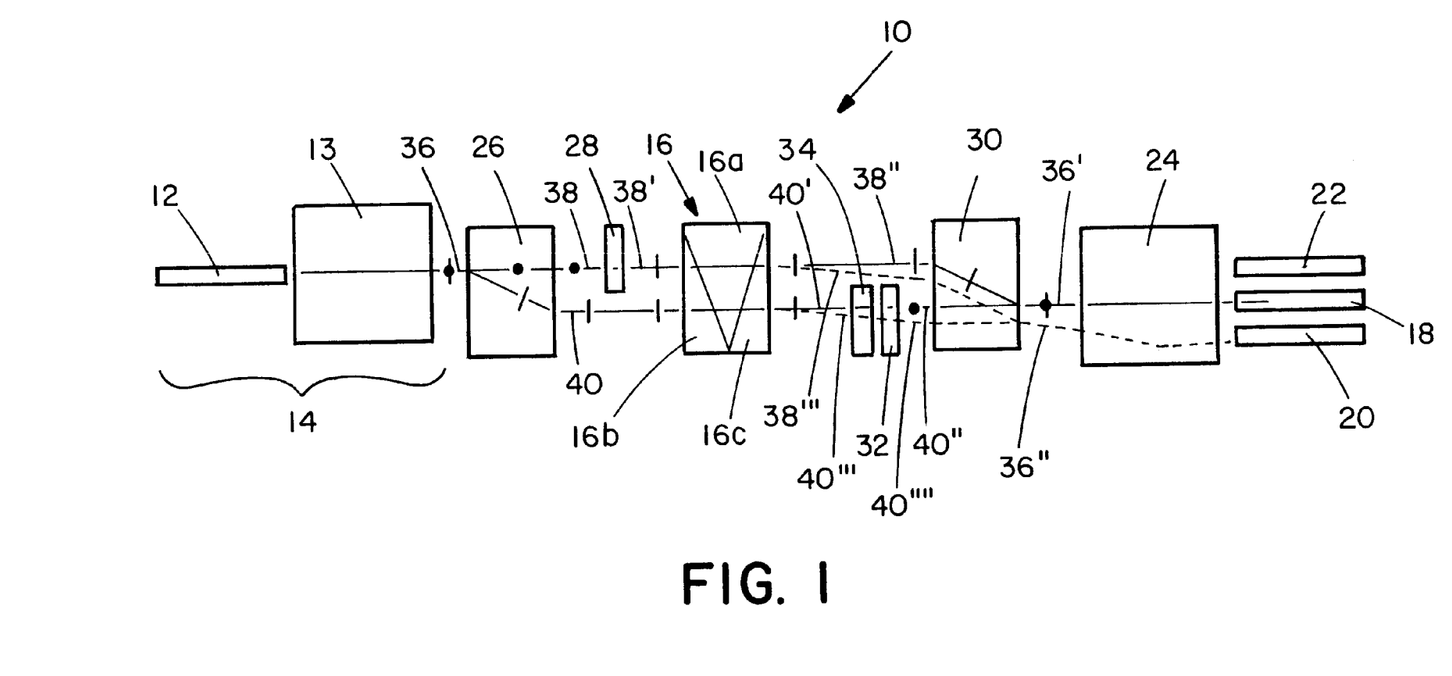
FIG. 1 is an illustration of an ultra-fast 1×3 optical switch in accordance with the invention.

Referring to FIG. 1, there is shown a 1×3 optical switch 10 which is provided with an E-O beam deflector 16 that deflects or redirects an incoming light signal from an input port such as an input fiber 12 to one of a set of output ports or output fibers 18, 20, and 22 in a polarization independent manner. As shown, an input collimating lens 13 can be used to collimate the light signal from the input fiber 12. Typically, the input fiber 12 and the collimating lens 13 are formed together and pre-made as a collimator 14. An output collimating lens 24 can also be used to collimate the light signal before it is transmitted to one of the output fibers 18, 20, and 22. Although shown as a 1×3 switch, the optical switch 10 can easily be used as a 1×N switch, where N is the number of output ports that can be significantly larger than three.

The E-O deflector 16 includes a series of prisms 16a, 16b, and 16c made from, for example, a solid-state material. By applying an electric field across one or more of these prisms 16a, 16b, and 16c, the light signal is steered or redirected to one of the output ports.

In addition to the E-O deflector 16, the optical switch 10 includes a separator 26 and a first polarization converter 28 positioned between the collimator 14 and the E-O deflector 16, and a combiner 30 and a second polarization converter 32 positioned on the other side of the E-O deflector 16 between it and the output collimating lens 24. The optical switch 10 also includes a compensator plate 34 placed between the E-O deflector 16 and the second polarization converter 32 to ensure that the switching process is polarization independent and occurs with minimal polarization dependent loss.

In use, the collimator 14 transmits input light signals 36 to the optical switch 10 as arbitrarily polarized light. The separator 26 converts the light signal 36 into two linearly polarized beams 38 and 40 having orthogonal polarization directions, as identified by the filled circle, and the thick bar, respectively. The first polarization converter 28, placed in the path of one of the beams, for example, the beam 38, rotates the polarization direction of that beam by 90° so that the two beams 38' and 40 have the same polarization direction.

If no electric field is applied across the prisms 16a, 16b, and 16c, the two beams 38' and 40 pass through the E-O beam deflector 16 as undeflected light beams 38" and 40'. The second polarization converter 32 rotates the polarization direction of the beam 40' by 90° to a rotated beam 40" such that polarization directions of the beams 38" and 40" are now orthogonal to each other. The combiner 30 recombines these two beams into a single beam 36' that is again randomly polarized. The light beam 36' passes through the collimating lens 24 where the beam is focused before it enters the output fiber 18.

To switch the light signal from output fiber 18 to one of the other output fibers 20, 21, and 22, an electric field is applied across one or more of the prisms of the E-O deflector 16. For example, to direct the light signal to the output fiber 20, a sufficient voltage is applied to one of or a combination of the prisms 16a, 16b, and 16b to deflect the two light beams 38' and 40 downward as light beams 38'" and 40'". The converter 32 rotates the polarization direction of the beam 40'" to a rotated beam 40"" that has the same polarization direction as the beam 38'". The two beams 38'" and 40"" are combined by the combiner 30 to a randomly polarized beam 36" which is subsequently transmitted to the output fiber 20 via the collimating lens 24.

The various components of the of the optical switch 10 will now be described in greater detail. Each of the polarization converters 28 and 32 in the illustrated embodiment is a half-wave plate. To rotate the polarization direction of an incoming beam 90°, the optical axis (or c-axis) of the half-wave plate is aligned to be perpendicular to the incoming beam propagation direction and either 45° or 135° to the polarization direction of the beam. Alternatively, the converters 28 and 32 can be Faraday rotators or quartz polarization rotators.

Figure 2A:
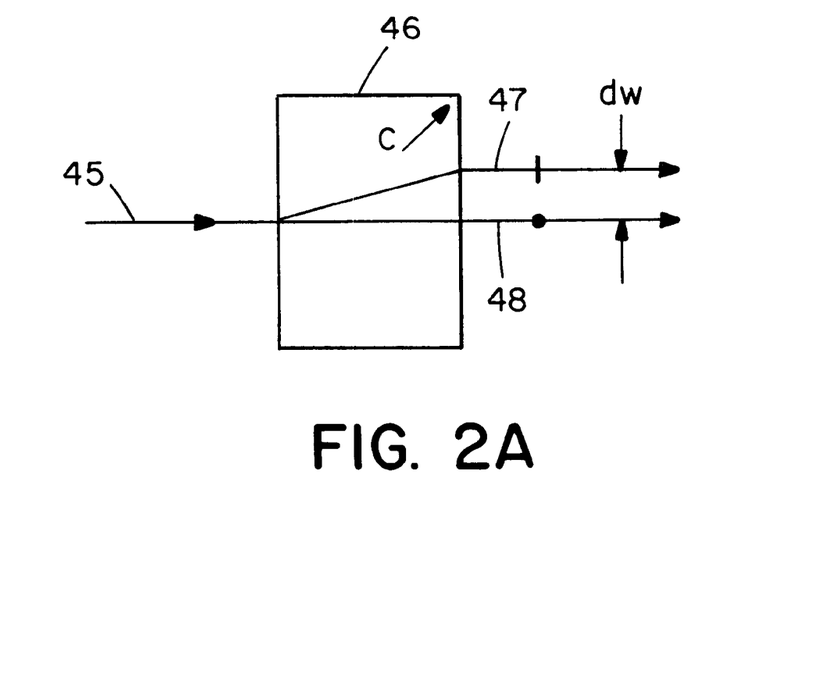
FIG. 2A is an illustration of a light signal with a zero degree of angle of incidence passing through a walk-off crystal.
Figure 2B:
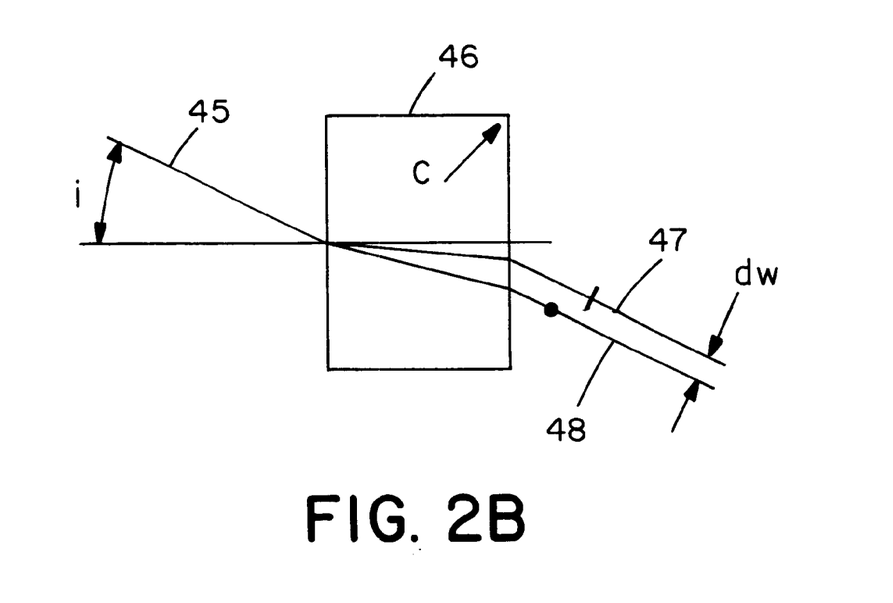
FIG. 2B is an illustration of a light signal with an angle of incidence greater than zero passing through a walk-off crystal.

The separator 26 and the combiner 30 can be walk-off crystals made from any suitable birefringent crystal, such as, for example, yttrium vanadate or rutile. An illustration of how these crystal separate an incident light beam is shown FIG. 2A. When a light signal 45 passes through a walk-off device 46 with an optical axis c at an angle of incidence of zero degrees, the orthogonal polarized components of the light signal separate into the two beams 47 and 48. The separation distance between the two beams 47 and 48 is typically referred to as the walk-off distance, $d_w$. However, the walk-off distance, $d_w$, between the two beams is dependent on the incident angle, i, of the light beam 45 (FIG. 2B). That is, the walk-off distance of the two beams 47 and 48 in FIG. 2A is slightly different than that of the beams in FIG. 2B.

Note that although the walk-off distance referred to above is the distance between two beams that have been separated apart from a single incoming beam, the walk-off distance can also refer to the distance between two incoming beams that are combined together by the walk-off device into a single outgoing beam. In those circumstances, the angle, i, would refer to the deflection angle of the single outgoing beam.

The relationship between the walk-off distance, $d_w$, and the incident (deflection) angle, i, can be calculated by ray tracing methods. The results of such a calculation are shown below in Table 1 for an yttrium vanadate walk-off device with a thickness of approximately 10 mm and for a wavelength of about 1.55 $\mu$m.

TABLE 1

Walk-off Distances for Various Incident/Deflection Angles

| Incident/deflection angle, i (degrees) | 0 | 5 | 10 | 15 | 20 | 25 |
|---|---|---|---|---|---|---|
| Walk-off distance, $d_w$ (mm) | 0.994 | 0.992 | 0.986 | 0.976 | 0.959 | 0.935 |
| Variation in $d_w$ (mm) | 0 | −0.002 | −0.008 | −0.018 | −0.035 | −0.059 |

Figure 3A:
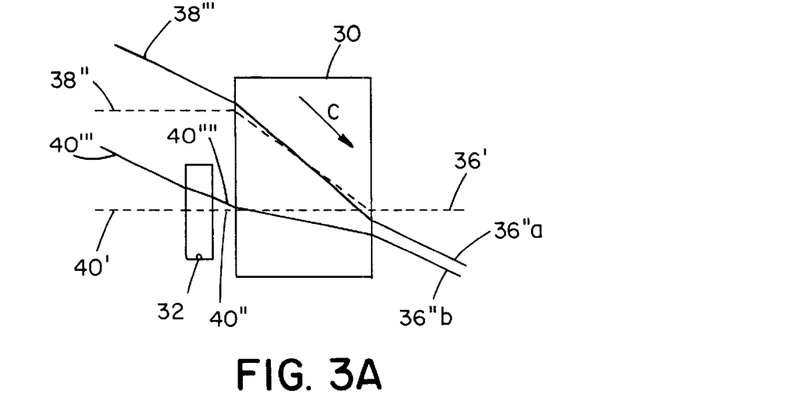
FIG. 3A is an illustration of a walk-off crystal with a converter used for recombining two beams of polarized light having orthogonal polarization directions.
Figure 3B:
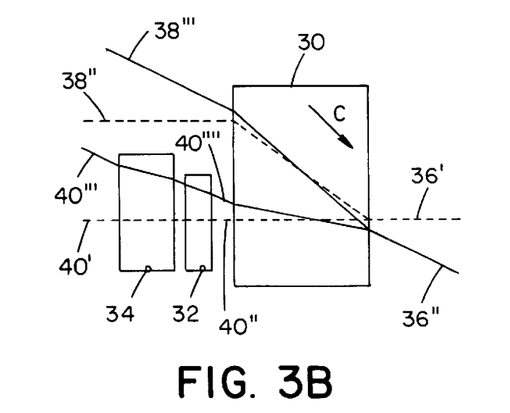
FIG. 3B is an illustration of the walk-off crystal and the converter of FIG. 3A combined with a compensator in accordance with the invention.

As can be seen, the walk-off distance, $d_w$, for an angle of incidence/deflection, i, of zero degrees is 0.994, but note that the walk-off distance, $d_w$, decreases as the incident/deflection angle, i, increases, as indicated in the third row (variation in the walk-off distance). For the optical device 10 discussed above, this variation causes the two beams 38''' and 40''' to recombine imperfectly as two outgoing beams 36''a and 36''b thereby inducing a polarization dependent loss (FIG. 3A). To reduce this effect, the compensating plate 34 is place in front of the combiner 30, as shown in FIG. 3B, so that the two beams 38''' and 40'''', recombine into the single beam 36'' regardless of the deflection angle. Of course, the two beams 38'' and 40' (FIG. 1) will recombine perfectly regardless whether the compensator plate 34 used, since the deflection angle of the outgoing beam 36' is zero. Further, the variation in the walk-off distance is not symmetrically the same for negative incident/deflection angles. However, an appropriately designed compensator plate can compensate for these negative incident/deflection angles as well. It should also be noted that the compensating plate 34 can be placed in the path of the beam 38''' to eliminate or minimize walk-off distance variations. Also, the compensating plate 34 can be place in the path of either of the two separated beams transmitted from the separator 26 (FIG. 1) to compensate for possible walk-off distance variations produced by the separator 26.

Figure 3C:
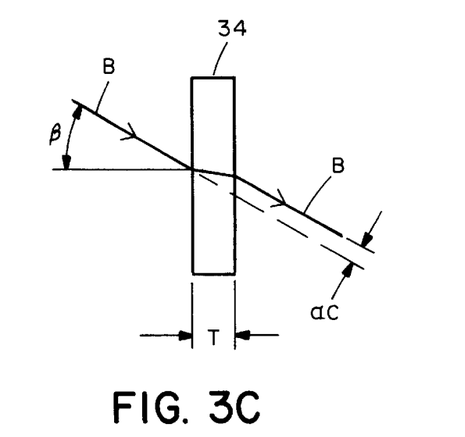
FIG. 3C is an illustration of the compensator plate of FIG. 3B.

The compensating plate 34 can be an isotropic plate with a thickness of T, as shown in FIG. 3C. It is well known in the art that the displacement, $d_c$, of a light beam B varies with the angle of incidence, $\beta$. By choosing the plate 34 with an appropriate thickness and refractive index, it is possible to compensate for the walk-off distance variation produced by typical walk-off crystals. That is, by properly choosing the plate 34, the displacement, $d_c$, of one of the two separated beams will compensate for the variation in $d_w$ such that the two beams are combined by the combiner 30 into a single beam with minimal polarization dependent loss.

Figure 3D:
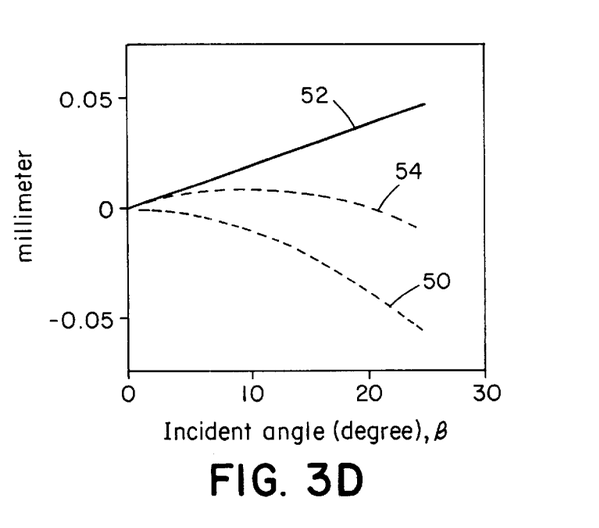
FIG. 3D is a graph showing the compensation effects of the compensator plate of FIG. 3B.

Referring now to FIG. 3D, there is shown an example of the compensation effects for a particular compensating plate 34 with a thickness, T, of about 0.3 mm and an index of refraction of 1.5, which is approximately the index of refraction of a glass plate. In this figure, the bottom curve 50 shows the walk-off distance variation of the two beams 38''' and 40''' (FIG. 3B), the upper curve 52 shows the displacement, $d_c$, for example, of the beam 40'''' (FIG. 3B) produced by the compensating plate 34, and the middle curve 54 shows the compensated result which is essentially zero indicating that the polarization dependent loss is reduced nearly to zero.

Figure 4A:
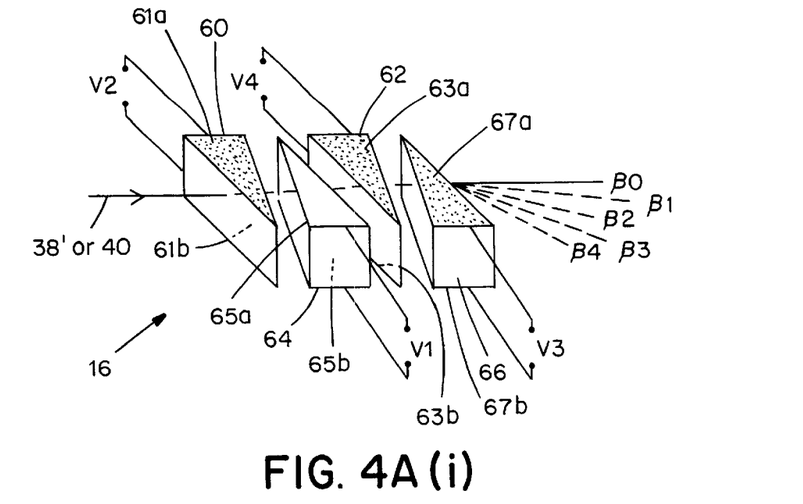
Figure 4B:
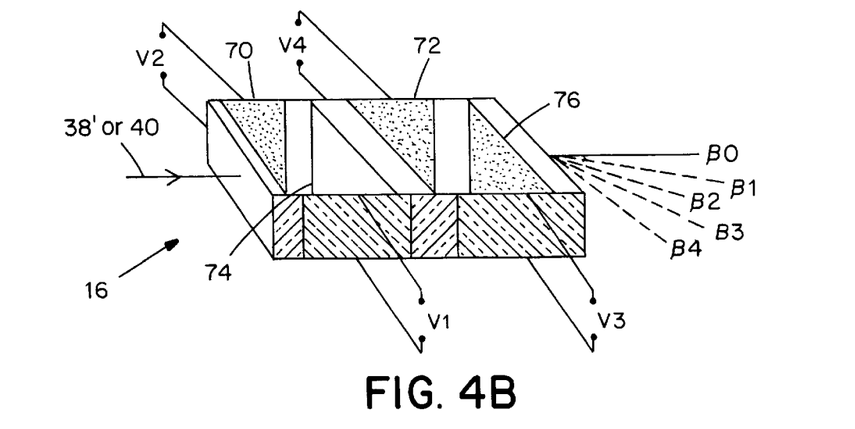
FIG. 4B is an illustration of an alternative embodiment of the E-O deflector.
Figure 4C:
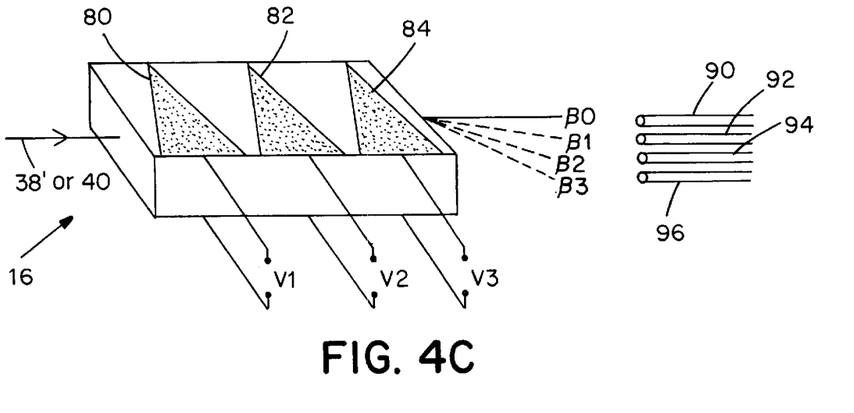
FIG. 4C is an illustration of yet another alternative embodiment of the E-O deflector.

Turning now to the E-O deflector 16, there are shown in FIGS. 4A–4C three alternative embodiments of the multistage E-O deflector 16. Again, each of these E-O deflectors 16 includes a set of prisms similar to those shown in FIG. 1. In principle, the beam deflection properties of these deflectors are based on prisms having index of refractions that are varied by changing the electric field applied across these prisms. Thus, when no electric field is applied to a prism, the particular prism has an index of refraction of $n_0$. Applying an electric field across the prism induces a change in the index of refraction $\Delta n$ so that the resulting index of refraction of the prism is $n=n_0+\Delta n$. Furthermore, a light beam traversing the prism is deviated by an amount depending upon the prism shape and its orientation, as well as the index of refraction induced by the electric field.

The E-O prism can be made from crystals having E-O properties such as lithium tantalate, lithium niobate, potasium tantalum niobium oxide (KTN). Other suitable E-O materials include ferroelectric complex oxides in the form of a transparent ceramic such as lead magnesium niobate (PMN), and liquid crystal dispersed polymers.

The proper arrangement of the prisms depends on the material of which the prisms are made. For example, for the prisms 60, 62, 64, 66 shown in FIGS. 4A(i) and 4A(ii), materials with linear E-O properties are used, such as, for example, single crystals including lithium tantalate, and lithium niobate, or any other suitable single crystal material. In this configuration, the prisms 60 and 62 have the same domain that is opposite the domain of prisms 64 and 66. To generate the desired electric field across one or more of these prisms, the appropriate voltages are applied to the respective electrodes 60a and 60b, 62a and 62b, 64a and 64b, and 66a and 66b, of the prisms 60, 62, 64, and 66. Each of the electrodes is typically a layer of any suitable conductive material such as, for example, gold, nickle, or titanium.

By applying voltages with opposite polarities to the prisms with the same domain, that is to prisms 60 and 62 or to prisms 64 and 66, or voltages with the same polarity to prisms with opposite domains, the angles that the light beam (38' or 40) is deflected by the prisms is additive. For example, if a voltage V1 is applied to the electrodes 65a and 65b of the prism 64, the beam is directed along a path B1, and when a voltage V2 having the same polarity as V1 is applied to the electrodes 61a and 61b across the prism 60, the beam is further deflected such that it is directed along a path B2.

Referring now to FIG. 4B, there is shown a deflector 16 with a configuration of prisms 70, 72, 74, 76 that uses a "domain inversion" process. Such a "domain inversion" prism is produced by subjecting a single crystal to a high voltage under high temperatures during the fabrication process. Depending on the type of crystal, the high voltage applied to the crystal is approximately in the range of 300 volts to 12,000 volts, and the temperature is in the range of about 200° C. to 1200° C.

Like the prisms of FIG. 4A, each of these prisms 70, 72, 74, and 76 also includes a pair of electrodes to which a voltage is applied to create an electric field across the respective prism. With these crystals, the domain of the prisms 70 and 72 is the same, and the prisms 74 and 76 have an opposite domain. When the voltages V1 and V2 having the same polarity are applied to the prisms 70 and 74, respectively, the light beam will be directed along a path B2 which has a deflection angle that is double that of the path B1 along which the light beam is directed when only the voltage V1 is applied.

Shown in FIG. 4C is an arrangement of prisms 80, 82, 84 of the E-O deflector 16 which uses materials with quadratic E-O properties, such as E-O ceramics and polymers. With this arrangement, the beam deflection induced by each prism is additive when the voltages V1, V2, V3 having the same polarity are applied to the electrodes (similar to those described above) of the respective prisms 80, 82, 84.

The multi-stage construction of the E-O deflectors shown in FIGS. 4A–4C enable the use of simple control schemes such as digital controlling. In such schemes, a simple voltage power supply with "on-off" logic circuits is suitable for the control process. A typically digital control scheme for the embodiment of the deflector 16 illustrated in FIG. 4C is shown below in Table 2. In this scheme, when no voltage is applied across any of the prisms 80, 82, 84, the light beam remains undeflected and is transmitted along the path B0 to the output fiber 90. When a voltage V1 is applied to the prism 80 the beam is directed along the path B1 to the output fiber 92. And when the voltage V2 (having the same voltage and polarity as V1) is applied to the prism 82, the beam is directed along a path B2 to the output fiber 94, and similarly when the voltage V3 is applied to the prism 84, the beam is directed along a path B3 to the output fiber 96. Thus, by applying a voltage Vm across one of or a combination of the three prisms 80, 82, or 84, an incoming light beam can be switched to any one of the output fibers 92, 94, or 96. And of course, if no voltage is applied across the prisms, the light beam is transmitted along the path B0 to the output fiber 90.

TABLE 2

Digital Control Scheme

| Prism Status | | | |
|---|---|---|---|
| V1 | V2 | V3 | Light being switched to |
| Off | Off | Off | Path B0 → Fiber 90 |
| On | Off | Off | Path B1 → Fiber 92 |
| On | On | Off | Path B2 → Fiber 94 |
| On | On | On | Path B3 → Fiber 96 |

Note that the amount the light beam has to be deflected so that it is properly directed to one of the output fibers is determined by the optical properties of the second collimating lens 24 and the spacing between the output fibers 18, 20, and 22 for the array shown in FIG. 1, or the output fibers 90, 92, 94, and 96 for the fiber array shown in FIG. 4C. In general, a more compact optical switch 10 requires less power to operate. For such compact devices, the spacing between the output fibers should be as small as possible, but large enough to satisfy cross-talk specifications.

As an example, a SLW-1.8 graded index (or GRIN) lens such as that fabricated by NSG, Inc., Japan, can be employed as the second collimating lens 24 for the output fibers 90, 92, 94, and 96 of the four-fiber array shown in FIG. 4C. With such an array, the deflection angle required to redirect the light beam from one fiber to an adjacent fiber is about 0.89° if the spacing between the fibers 90, 92, 94, and 96 is approximately 30 μm.

Figure 5A:
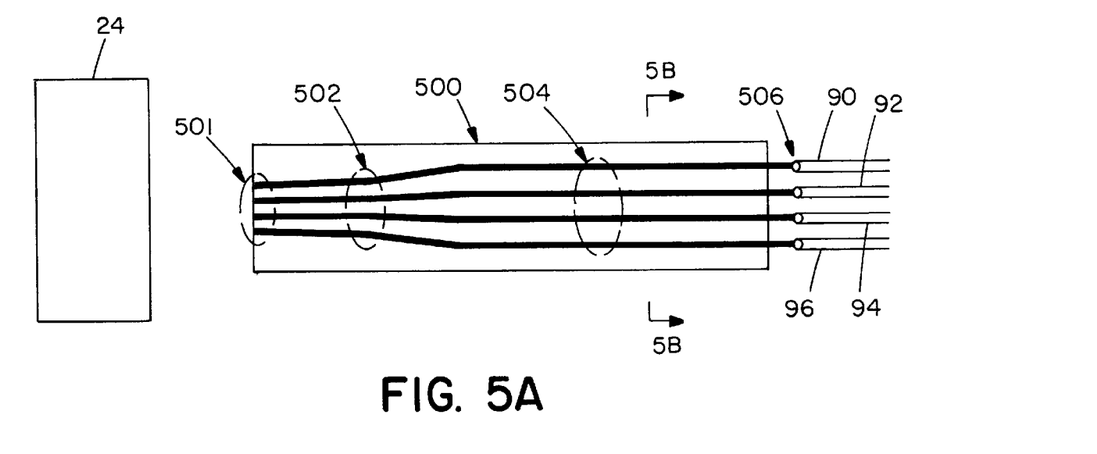
FIG. 5A is an illustration of a fiber pigtailed channel wave-guide array.
Figure 5B:
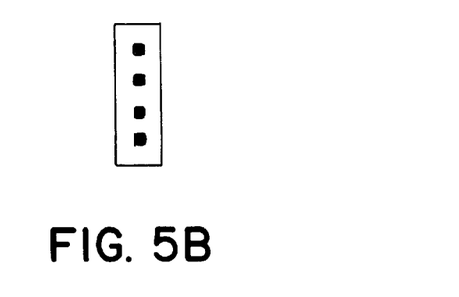
FIG. 5B is a cross-sectional view of the wave-guide array taken along the line 5B—5B of FIG. 5A.

However, because a single mode fiber has a cladding size of about 125 μm, special measures have to be taken for reducing the spacing to 30 μm. One way to achieve this is to position a fiber pigtailed channel wave-guide array 500 illustrated in FIG. 5 between the collimating lens 24 and the output fibers 90, 92, 94, and 96 to guide the optical signal from the collimating lens 24 to one of the output fibers. The array 500 can be made, for example, by silica-on-silicon methods and includes a set of narrow channels 501 that are connected to one end a set of wider channels 504 with four transition channels 502. The other end of the wide channels 504 are connected to the output fibers 90, 92, 94, and 96 discussed above.

The variation in the refractive index, Δn, required to deflect a light beam by an angle, α, of 0.89°, is obtained from the relationship $$\Delta n = \alpha d / L$$

where d is diameter of the beam, and L is the effective length of a single prism. For d=0.3 mm and L=6 mm, Δn=0.000775. Shown in Table 3 are the estimated voltages that have to be applied to three illustrative materials to produce this required variation in the index of refraction, as well as the estimated switching times achieved with deflectors made with these materials.

TABLE 3

Voltage Requirements and Switching Times

| Material | LiTaO | Ceramic | Liquid crystal polymer |
|---|---|---|---|
| Estimated Voltage (V) | 1000 | 100 | 10 |
| Estimated switching time | ~nsec | ~μsec | ~msec |

Accordingly, when the deflector 16 is made from materials such as LiTaO, the optical switch 10 is capable of switching times in the order of nanoseconds. Note that regardless what material is used, the E-O deflector 16 requires very low currents to operate. Thus, when in use, the power consumption of the optical switch 10 is typically less than one watt.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical switch for switching an incoming light signal to an output port, comprising:
    a walk-off device,
    a multi-angular walk-off compensator which compensates for walk-off distance variations of two polarized beams, with orthogonal polarization directions, associated with the walk-off device, one beam passing through the compensator, another beam bypassing the compensator.

2. The optical switch of claim 1, wherein the walk-off device is a crystal with birefringence.

3. The optical switch of claim 2, wherein the crystal is yttrium vanadate or rutile.

4. The optical switch of claim 1, wherein the compensator is an isotropic plate.

5. The optical switch of claim 4, wherein the isotropic plate is glass.

6. The optical switch of claim 1, wherein the walk-off device is arranged to separate an incoming beam into the two polarized beams.

7. The optical switch of claim 1, wherein the walk-off device is arranged to combine the two polarized beams into a single beam.

8. An optical switch for switching an incoming light signal to an output port, comprising:
    a separator which separates the incoming light signal into a first polarized beam and a second polarized beam, the polarization direction of the first beam being orthogonal to that of the second beam;
    a first converter which rotates the polarization direction of one of the two beams, the polarization directions of the two beams being the same after the polarization direction of one of the two beams is rotated;
    an electro-optic (E-O) deflector which deflects the two beams having the same polarization directions;
    a walk-off compensator which receives only one of the two different beams and displaces the one of the two deflected beams relative to the other beam;
    a second converter which rotates the displaced beam, the polarization direction of the first beam being orthogonal to that of the second beam after the displaced beam is rotated; and
    a combiner which combines the two beams into a single output light signal.

9. The optical switch of claim 8 wherein the separator and the combiner are walk-off devices.

10. The optical switch of claim 9 wherein each of the walk-off devices is a crystal with birefringence.

11. The optical switch of claim 10 wherein the crystal is made from the group consisting of yttrium vanadate and rutile.

12. The optical switch of claim 8 wherein the first converter and the second converter are Faraday rotators.

13. The optical switch of claim 8 wherein the first converter and the second converter are quartz rotators.

14. The optical switch of claim 8 wherein the first converter and the second converter are half-wave plates.

15. The optical switch of claim 8 wherein the compensator is an isotropic plate.

16. The optical switch of claim 8 wherein the E-O deflector includes at least one prism having an index of refraction that changes as an electric field is applied across the prism.

17. The optical switch of claim 16 wherein the at least one prism is a crystal made from the group consisting of lithium tantalate, lithium niobate, and KTN.

18. The optical switch of claim 16 wherein the at least one prism is made from a ferroelectric ceramic.

19. The optical switch of claim 16 wherein the at least one prism is a liquid crystal made from a dispersed polymer.

20. The optical switch of claim 8 wherein the E-O deflector includes two or more prisms, each prism having an index of refraction that changes as an electric field is applied across that prism.

21. The optical switch of claim 20 wherein the two or more prisms have linear E-O properties, the deflection of the two beams produced by the two or more prisms being additive when the electric field applied across each prism has the same polarity.

22. The optical switch of claim 20 wherein the two or more prisms are constructed in a domain inversion arrangement, the deflection of the two beams produced by the two or more prisms being additive when the electric field applied across a respective prism has a polarity that is opposite to that applied across an adjacent prism.

23. The optical switch of claim 20 wherein the two or more prisms are made from materials with quadratic E-O properties.

24. The optical switch of claim 8 further comprising a collimator which directs the incoming light signal to the separator.

25. The optical switch of claim 24 wherein the collimator includes an input lens and an input port.

26. The optical switch of claim 8 further comprising an output lens and an array of output ports.

27. The optical switch of claim 26 further comprising a fiber pigtailed channel wave-guide array which directs the light signal from the output lens to the array of output ports.

28. A method of switching a input light signal to one or more output ports, comprising:
    separating the input light signal into a first polarized beam and a second polarized beam, the polarization direction of the first beam being orthogonal to that of the second beam;
    rotating the polarization direction of one of the two beams, the polarization directions of the two beams being the same after the polarization direction of one of the two beams is rotated;
    deflecting the two beams having the same polarization directions;
    displacing one of the two deflected beams relative to the other beam to compensate for walk-off distance variations;
    rotating the polarization direction of the displaced beam, the polarization direction of the first beam being orthogonal to that of the second beam after the displaced beam is rotated; and
    combining the two beams into a single output light signal.

29. The method of claim 28 further comprising collimating the input light signal prior to separating the input light signal.

30. The method of claim 28 further comprising collimating the single output light signal.

* * * * *